United States Patent
Misra et al.

(10) Patent No.: US 11,370,700 B2
(45) Date of Patent: Jun. 28, 2022

(54) COATED SOLAR CONTROL GLASS ARTICLES

(71) Applicants: SAINT-GOBAIN GLASS FRANCE, Courbevoie (FR); Soumyadeep Misra, Tamil Nadu (IN)

(72) Inventors: Soumyadeep Misra, Tamil Nadu (IN); Arpan Basu, West Bengal (IN); Shrijit Sudhir Kulkarni, Maharashtra (IN); Pradeep Kapadia, Maharashtra (IN)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 208 days.

(21) Appl. No.: 16/647,331

(22) PCT Filed: Sep. 11, 2018

(86) PCT No.: PCT/IN2018/050587
§ 371 (c)(1),
(2) Date: Mar. 13, 2020

(87) PCT Pub. No.: WO2019/053741
PCT Pub. Date: Mar. 21, 2019

(65) Prior Publication Data
US 2021/0122670 A1    Apr. 29, 2021

(30) Foreign Application Priority Data
Sep. 15, 2017  (IN) .............................. 201741032744

(51) Int. Cl.
*C03C 17/34* (2006.01)
*B32B 17/10* (2006.01)

(52) U.S. Cl.
CPC .... *C03C 17/3435* (2013.01); *B32B 17/10036* (2013.01); *B32B 17/10201* (2013.01);
(Continued)

(58) Field of Classification Search
None
See application file for complete search history.

(56) References Cited

U.S. PATENT DOCUMENTS 6,994,910 B2    2/2006   Stachowiak
9,709,717 B2    7/2017   Hevesi et al.
(Continued)

FOREIGN PATENT DOCUMENTS

CH    699 041 B1    1/2010
JP    S63-206333 A  8/1988
(Continued)

OTHER PUBLICATIONS

Devonshire, The Effects of Infraredreflective and Antireflective Glazing on Thermal Comfort and Visual Performance: Literature Review, Mar. 2002. (Year: 2002).*
(Continued)

*Primary Examiner* — David Sample
(74) *Attorney, Agent, or Firm* — Pillsbury Winthrop Shaw Pittman LLP

(57) ABSTRACT

A coated solar control glass article includes a transparent substrate provided with a multilayer coating having solar control properties is disclosed. The multilayer coating includes a metal nitride functional layer sandwiched between two transparent dielectric layers. The thickness of the dielectric layer provided above the functional layer is greater than 60 nm and less than 150 nm and the thickness of the dielectric layer provided above the transparent substrate is greater than 10 nm and less than 45 nm. The coated solar control glass article exhibits gold/rose/purple colored reflection on the side opposite to the side provided with the multilayer coating.

22 Claims, 3 Drawing Sheets

(52) U.S. Cl.
CPC . *B32B 2307/4026* (2013.01); *B32B 2307/412* (2013.01); *C03C 2217/281* (2013.01); *C03C 2218/156* (2013.01)

(56) References Cited

U.S. PATENT DOCUMENTS

| | | | |
|---|---|---|---|
| 2004/0137234 A1* | 7/2004 | Stachowiak | C03C 17/3435 428/428 |
| 2005/0079369 A1* | 4/2005 | Stachowiak | C03C 17/3649 428/469 |
| 2007/0172647 A1* | 7/2007 | Kleideiter | C03C 17/3435 428/336 |
| 2011/0146172 A1 | 6/2011 | Mauvernay et al. | |
| 2011/0262726 A1 | 10/2011 | Knoll et al. | |
| 2012/0177899 A1 | 7/2012 | Unquera et al. | |
| 2015/0072137 A1* | 3/2015 | Deneil | C03C 17/009 428/334 |

FOREIGN PATENT DOCUMENTS

| WO | WO 2005/105687 A2 | 11/2005 |
|---|---|---|
| WO | WO 2016/199676 A1 | 12/2016 |

OTHER PUBLICATIONS

Extended European Search Report as issued in European Patent Application No. 18856308.4, dated May 10, 2021.
International Search Report and Written Opinion of the International Searching Authority as issued in International Patent Application No. PCT/IN2018/050587, dated Nov. 22, 2018.
Xie, R.-J., et al., "Optical Properties of (Oxy)Nitride Materials: A Review," National Institute for Materials Science, Namiki 1-1, Tsukuba, 305-0044 Ibaraki, Japan, Journal of the American Ceramic Society, vol. 96, (2013), pp. 665-687.
Examination Report as issued in Indian Patent Application No. 201741032744, dated Mar. 5, 2020.

* cited by examiner

COATED SOLAR CONTROL GLASS ARTICLES

CROSS-REFERENCE TO RELATED APPLICATIONS

This application is the U.S. National Stage of PCT/IN2018/050587, filed Sep. 11, 2018, which in turn claims priority to Indian patent application number 201741032744 filed Sep. 15, 2017. The content of these applications are incorporated herein by reference in their entireties.

TECHNICAL FIELD

The present disclosure relates, in general to a coated glass article, and more specifically to a heat treatable colored solar control glass article having a gold or rose/purple colored reflection and a method of making the same.

BACKGROUND

Solar control coatings are known in the art that are usually made of two or more layers of metal or metallic oxide (typical metals include titanium, zinc, copper, tin, and silver, and typical alloys include brass and stainless steel). These coatings are microscopically thin, yet give a slightly brown or gray color to the glass substrate bearing them. The exact form and thickness of the coating vary quite widely depending on the manufacturer. Early solar control coatings often had a layer of silver sandwiched between two layers of metal oxide. Later metal oxide layers made from metals other than silver were found to yield far better results. These improved coatings reduced emissivity and allowed high light transmission.

Solar control coatings having a layer stack of glass/$Si_3N_4$/Nb/$Si_3N_4$ are known in the art, where the metallic Nb layer is the sole infrared (IR) reflecting layer in the coating. In certain instances, the Nb IR reflecting layer may be nitrided. While such layer stacks provide efficient solar control, the reflection color obtained by such layer stacks has never been worked upon. For example, a known solar control coating having a layer stack of glass/$Si_3N_4$/NbN/$Si_3N_4$ has an external a* value in a range between −3 and +3; and b* value in a range between −20 and +10. This implies that a glass article with the above solar control layer stack would have a neutral to blue/green external reflection.

Referring to U.S. Pat. No. 6,994,910 describes a heat treatable coated article with NbN acting as the IR reflecting layer. Referring to PCT publication number 2005105687 relates to a solar control coating having a layer stack of glass/$Si_3N_4$/NbN/$Si_3N_4$ that is heat treatable and bendable. The glass article coated with the solar control coating exhibits a blue/green color in external reflection. The solar control articles described in the cited references focus on achieving solar control properties and have either a neutral or a blue/green external reflection.

Notwithstanding all the past experience and technology which are available for producing solar control articles, it has been discovered that although these coated articles are effective in solar control, the solar control layer stack was never engineered to have different reflection colors. Hence there is scope for obtaining different reflection colors while retaining their solar control properties. For example, most of the solar control glass articles available currently in the market have a neutral or blue-green color in external reflection. A study on the emerging market trends revealed that bluish-green color is not to everyone's liking and may not be appropriate for every kind of building. Since these solar control articles are generally more expensive than their ordinary counterparts, it becomes more important to ensure that the extra cost is justified by multiple combined features of the coated articles.

Further, it has been found that the color of the external and internal refection of these articles can be improved upon by working on the dielectric layers of the solar control layer stack. The external reflection of the solar control coated articles can be varied by varying the coating thickness of the $Si_3N_4$ layers of the solar control layer stack.

The present disclosure relates to a coated solar control glass article that comprises of a thin multilayer stack provided on one side of a transparent substrate. The thin multilayer stack comprising a metal nitride functional layer sandwiched between two transparent dielectric layers. The thickness of the metal nitride functional layer and the dielectric layer are designed in such a way that the solar control glass article exhibits a golden or rose/purple colored external appearance on the other side of the transparent substrate while retaining its solar control properties. Thus these coatings can block part of the solar spectra very efficiently in addition to having a golden or rose/purple colored appearance. The light transmission from exterior to interior of a building incorporated with these coated solar control glass articles is also decreased thereby reducing glare for the building occupants.

SUMMARY OF THE DISCLOSURE

In one aspect of the present disclosure, a transparent substrate comprising a multilayer coating having solar control properties is provided. The multilayer coating comprises of a metal nitride functional layer sandwiched between two transparent dielectric layers. The dielectric layer provided above the functional layer is thicker than the dielectric layer provided below the functional layer. Particularly, the thickness of the dielectric layer provided above the functional layer is greater than 60 nm and less than 150 nm and that of the dielectric layer provided above the transparent substrate is greater than 10 nm and less than 45 nm.

In one other aspect of the present disclosure, a heat treatable solar control glass article is disclosed. The heat treatable solar control glass article comprises of a transparent substrate provided with the multilayer coating and an enamel comprising glass frit, an organic polymer and a pigment. The enamel is provided above the multilayer coating. The heat treatable solar control glass article can be handled before the heat treatment.

In another aspect of the disclosure, a composite glazing comprising a plurality of glass substrates is disclosed. One of the glass substrates of the plurality of glass substrates is the transparent substrate comprising a multilayer coating having solar control properties or a heat treatable solar control glass article or a heat treated solar control glass article of the present disclosure.

Other features and aspects of this disclosure will be apparent from the following description and the accompanying drawings.

BRIEF DESCRIPTION OF THE DRAWINGS

Embodiments are illustrated by way of example and are not limited to those shown in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

Wherever possible, the same reference numbers will be used throughout the drawings to refer to the same or similar parts. Embodiments disclosed herein are related to coated solar control glass articles.

Figure 1:
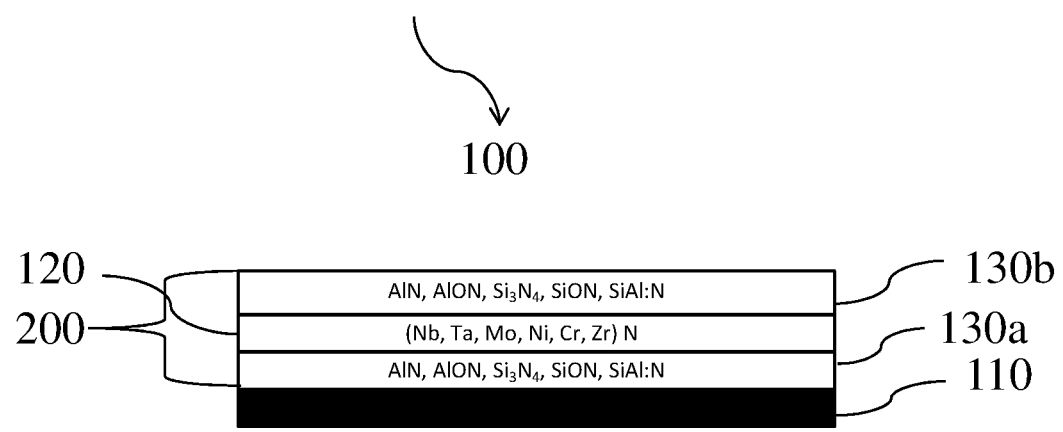
FIG. 1 illustrates a coated solar control glass article, according to one embodiment of the present disclosure.

A coated solar control glass article 100 according to one embodiment of the present disclosure is illustrated in FIG. 1. The coated solar control glass article 100 comprises of a glass substrate 110 provided with a multilayer coating 200. The multilayer coating 200 comprises of a metal nitride functional layer 120 sandwiched between two transparent dielectric layers 130a, 130b. The dielectric layer 130a is in direct contact with the glass substrate 110 and the dielectric layer 130b is provided above the metal nitride functional layer 120.

The metal nitride functional layer 120 comprises of at least one metal nitride selected from the group consisting of niobium, tantalum, molybdenum, nickel, chromium and zirconium. In a specific embodiment, the metal nitride functional layer 120 is niobium nitride (NbN). In another specific embodiment, the metal nitride functional layer 120 is nickel chromium nitride (NiCrN). The transparent dielectric layers 130a, 130b are based on aluminium nitride, aluminium oxynitride, silicon nitride or silicon oxynitride or silicon aluminium nitride. In one specific embodiment, the transparent dielectric layers 130a, 130b is silicon nitride.

In one embodiment of the present disclosure, the thickness of the metal nitride functional layer 120 is greater than 10 nm and less than 35 nm. The thickness of the metal nitride functional layer 120 is adjusted to obtain a desired light transmission through the coated solar control glass article 100. In another embodiment of the present disclosure, the thickness of the transparent dielectric layers 130a, 130b is adjusted to optimize the reflectance and color of the transparent glass substrate 110. In one embodiment, the thickness of the dielectric layer 130b provided above the metal nitride functional layer 120 is greater than 60 nm and less than 150 nm and the thickness of the dielectric layer 130a in direct contact with the glass substrate 110 is greater than 10 nm and less than 45 nm.

In one embodiment, the multilayer coating 200 is applied on the transparent substrate 110 by physical vapor deposition using magnetron sputtering. In alternate embodiments, other suitable coating techniques may be used to obtain the multilayer coating 200.

Figure 2:
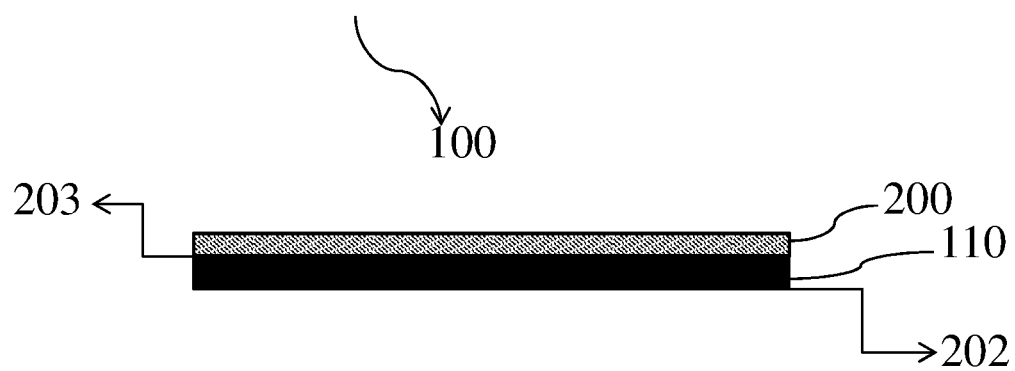
FIG. 2 illustrates a coated solar control glass article, according to another embodiment of the present disclosure.

FIG. 2 illustrates a coated solar control glass article 100, according to another embodiment of the present disclosure. The coated solar control glass article 100 comprises of a glass substrate 110 provided with the multilayer coating 200 of the present disclosure. In multiple embodiments, the glass substrate 110 may be a clear glass or a tinted glass. The multilayer coating 200 is provided on the coating side (C) 203 of the transparent glass substrate 110. When the coated solar control glass article 100 of the present disclosure is installed in a building the coating side 203 provided with the multilayer coating 200 faces the inside of a building. In such an arrangement, the glass side (G) 202 opposite to the coating side (C) 203 of the transparent glass substrate 110 exhibits a gold color reflection or a rose/purple color reflection depending on the thickness of the dielectric layer 130a, 130b when viewed from outside the building. The thickness of these dielectric layers 130a, 130b can be engineered to obtain an aesthetically improved gold or rose/purple color reflection.

The thickness of the dielectric layer 130b provided above the metal nitride functional layer 120 is increased to increase the b* value (measured on the glass side (G) 202) of the coated solar control glass article 100. A positive b* ($b^*_G$>10) value gives a yellowish appearance on the glass side 202 opposite to the coating side 203 (provided with the multilayer coating 200) of the transparent substrate 110 which contributes to the gold color reflection of the coated solar control glass article 100 on the glass side 202. Similarly, a* value (measured on the glass side (G) 202) is also engineered to be a positive value (0<$a^*_G$<4). A positive a* value in combination with the b* value results in golden color and helps avoiding greenish tint in the external reflection. However, in case of a*G>4 the red color dominates and hence should avoided for this particular application.

Similarly, a positive a* value (measured on the glass side (G) 202) (a*G>5) gives a reddish appearance on the glass side 202 opposite to the coating side 203 (provided with the multilayer coating 200) of the transparent substrate 110. This contributes to the rose/purple color reflection of the coated solar control glass article 100 on the glass side 202. A positive b* value (measured on the glass side (G) 202) results in rose color while a negative b* value (measured on the glass side (G) 202) provides purple color reflection. However, in the case of rose/purple color reflection of the coated solar control glass article 100 b* value is maintained below the a* value (b*G<a*G). The light transmission of the coated solar control glass article 100 is 10%-55% depending on the thickness of metal nitride functional layer 120.

Figure 3:
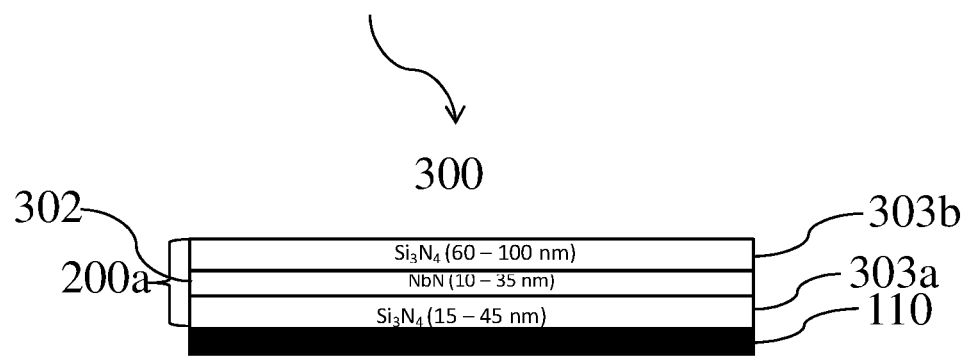
FIG. 3 illustrates a gold colored solar control glass article, according to another embodiment of the present disclosure.

A gold colored solar control glass article 300 according to one specific embodiment of the present disclosure is illustrated in FIG. 3. The gold colored solar control glass article 300 comprises of a transparent substrate 110 provided with a multilayer coating 200a comprising a niobium nitride layer 302 sandwiched between two transparent dielectric layers 303a, 303b based on silicon nitride. The thickness of the niobium nitride layer 302 ranges between 10 nm and 35 nm. The niobium nitride layer 302 acts as the IR blocking layer of the multilayer coating 200a and attributes to the solar control properties of the gold colored solar control glass article 300.

While the solar control properties depend entirely on the thickness of the niobium nitride layer 302, the light transmission ($T_L$) of the gold colored solar control glass article 300 is invariably proportional to the thickness of the niobium nitride layer 302. Hence it becomes important to have a balance between the solar control properties and the light transmission ($T_L$) values of the solar control glass article 300. Thus a thickness range between 10 nm and 35 nm of the niobium nitride layer 302 provides for the desired light transmission ($T_L$) while also maintaining the solar control properties of the solar control glass article 300.

The thickness of the silicon nitride layer 303a present above the transparent glass substrate 110 ranges between 15 nm and 45 nm and the thickness of the silicon nitride layer 303b present above the niobium nitride layer 302 ranges between 60 nm and 100 nm. The silicon nitride dielectric layer 303a, 303b contribute to the reflection color of the solar control glass article 300 and hence are designed in such a way that the glass side G of the transparent substrate 110 reflects a golden color and the coating side C of the transparent substrate 110 reflects a brilliant blue color. The multilayer coating 200a is designed to have as low as 10% internal reflection. In one aspect of the embodiment, the gold colored solar control glass article 300 may be enamelled. In multiple aspects of the embodiment, the gold colored solar control glass article 300 may be strengthened, toughened or heated to a temperature ranging between 500° C. and 700° C.

Figure 4:
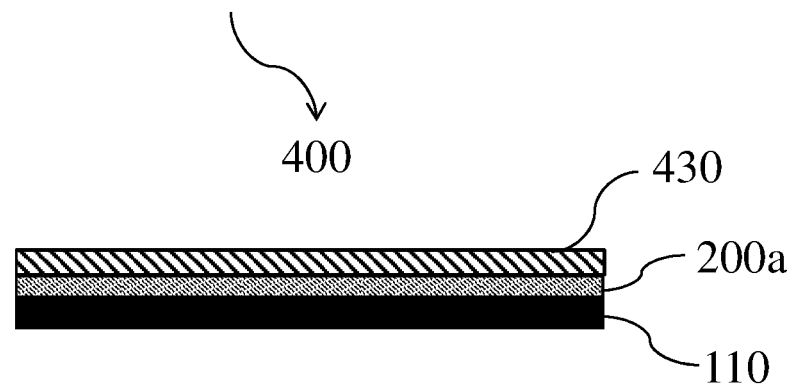
FIG. 4 illustrates a heat treatable gold colored solar control glass article, according to another embodiment of the present disclosure.

In another embodiment of the present disclosure, the gold colored solar control glass article 400 is heat treatable. FIG. 4 illustrates a heat treatable gold colored solar control glass article 400 comprising a transparent glass substrate 110 provided with a multilayer coating 200a of the present disclosure and an enamel 430. The enamel 430 is applied directly over the multilayer coating 200a of the present disclosure. The enamel layer 430 comprises of glass frit, an organic material and a pigment. In one aspect of the embodiment, the weight percentage of the organic material ranges between 5-40% of the total weight of the enamel 430 upon drying. In one other aspect of the embodiment, the organic material comprises of at least one or more materials selected from the group consisting of polyols, alkyds, acrylic, polyacrylic, polyacrylates, polymethacrylates, acrylamides, melamine, polycarbonates, acrylic-styrenes, vinyl-acrylic, urethanes, polyurethanes, polyesters, polyolefins, urethane alkyds, polyurea, amino resins, polyamides, epoxies, epoxy esters, phenolic resins, silicon resins, PVC, PVB, water-based resins or reaction products of photocurable chemicals or thermally curable chemicals.

In another aspect of the present embodiment, the glass frit present in the enamel 430 contains a zinc-based material or bismuth-based material or their combinations thereof. In yet another aspect, the pigment present in the enamel 430 contributes to the color of the transparent glass substrate 110 and hence the pigment may be selected based on the desired color of the transparent glass substrate 110. For example, titania provides white color, copper and cobalt oxide provide blue color and chromium oxide provides green color. In another example embodiment, grey/black colored enamel may be chosen to highlight the gold color external reflection of the heat treatable gold colored solar control glass article 400.

In one other aspect of the embodiment, the enamel 430 protects the heat treatable gold colored solar control glass article 400 from external damage such as scratches and the multilayer coating 200a does not peel off or degrade during edge grinding, storage, transportation, etc. In another embodiment of the present disclosure, the enamel 430 is provided for temporary resistance of the heat treatable gold colored solar control glass article 400 prior to tempering and is intended to be removed or destroyed during tempering process.

The heat treatable gold colored solar control glass article 400 can be tempered and can be handled before tempering. This implies that the heat treatable gold colored solar control glass article 400 may be coated with the enamel 430 at the manufacturing site and can be transported to other locations without causing the multilayer coating 200a to peel off or become damaged at the borders. Further the gold colored solar control glass article 400 coated with the enamel 430 may be cut, edge grind, beveled, drilled, sized and finished before being tempered. Here again the multilayer coating 200a does not peel off or get damaged at the borders of the cutting line.

In one other embodiment, the gold colored solar control glass article 400 coated with the enamel 430 can be tempered at a temperature above 600° C. During the tempering step the organic polymer present in the enamel 430 is completely burnt off. The other components of the enamel 430 fuse with the glass surface. The pigment present in the enamel 430 imparts colour to the glass substrate.

The heat treatable gold colored solar control glass article 400 has a $\Delta E^*$ value (change in color of the heat treatable gold colored solar control glass article 400 before and after heat treatment) less than 2.5. The emissivity of the heat treatable gold colored solar control glass article 400 also does not undergo change after heat treatment. The heat treatable gold colored solar control glass article 400 exhibits a higher IR reflection compared to standard glass. The gold colored solar control glass article 300 and the heat treatable gold colored solar control glass article 400 exhibit high durability values.

Figure 5:
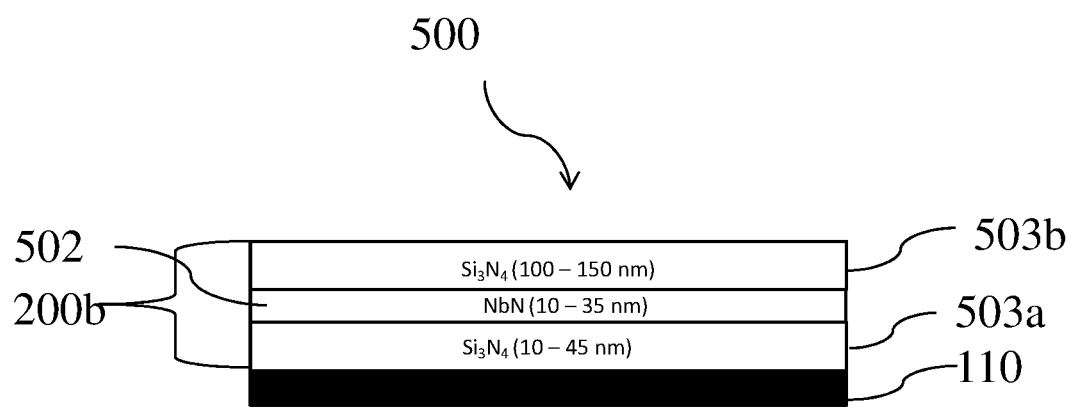
FIG. 5 illustrates a rose/purple colored solar control glass article, according to another embodiment of the present disclosure.

A rose/purple colored solar control glass article 500 according to one specific embodiment is illustrated in FIG. 5. The rose/purple colored solar control glass article 500 comprises of a transparent substrate 110 provided with a multilayer coating 200b comprising a niobium nitride layer 502 sandwiched between two transparent dielectric layers 503a, 503b based on silicon nitride. The thickness of the niobium nitride layer 502 ranges between 10 nm and 35 nm. The niobium nitride layer 502 acts as the IR blocking layer of the multilayer coating 200b and attributes to the solar control properties of the rose/purple colored solar control glass article 500.

The thickness of the silicon nitride layer 503a present above the transparent substrate 110 ranges between 10 nm and 45 nm and the thickness of the silicon nitride layer 503b present above the niobium nitride layer 502 ranges between 100 nm and 150 nm. The silicon nitride dielectric layer 503a, 503b contribute to the reflection color of the rose/purple colored solar control glass article 500 and hence are designed in such a way that the glass side G of the transparent glass substrate 110 reflects a rose/purple color and the coating side C of the transparent glass substrate 110 reflects a bluish, greyish, greenish blue color with 30% of internal reflection. In one aspect of the embodiment, the rose/purple colored solar control glass article 500 may be enamelled. In multiple aspects of the embodiment, the rose/purple colored solar control glass article 500 may be strengthened, toughened or heated to a temperature ranging between 500° C. and 700° C.

In one embodiment of the present disclosure, a composite glazing comprising a plurality of glass substrates bonded together by a polymeric interlayer is disclosed. One of the glass substrates of the plurality of glass substrates can be a gold colored solar control glass article 300 or a heat treated gold colored solar control glass article 400 or a rose/purple colored solar control glass article 500. In one aspect of the embodiment, the polymeric interlayer is made of polyvinyl butyral (PVB) and/or other organic polymers selected from the group consisting of polyurethane and/or ethylvinylacetate (EVA) and/or polyvinyl chloride and/or polyester and/or polyethylenevinylacetate (PET) and/or polycarbonate and/or polypropylene and/or polyethylene and/or polyurethacrylate or their combinations thereof.

In the following examples, the layer stacks were deposited by magnetically enhanced (magnetron) sputtering at room temperature on a transparent glass substrate having a thickness of 6 mm

Example 1

Gold Colored Solar Control Glass Article

Two glass substrates were coated with the below shown layer stacks:

Layer Stack 1: Glass//$Si_3N_4$ (24)/NbN (20)/$Si_3N_4$ (80)
Layer Stack 2: Glass//$Si_3N_4$ (24)/NbN (12)/$Si_3N_4$ (80)

Optical properties of the two glass samples coated with layer stack 1 and layer stack 2 are summarized in Table 1.

TABLE 1

Optical Properties of Gold Colored Solar Control Glass Article

| | | Outside | | | Inside | | | Emissivity |
|---|---|---|---|---|---|---|---|---|
| | $T_L$ | $R_{ext}$ | a*G | b*G | $R_{int}$ | a*C | b*C | E |
| Layer Stack 1 | 26.3 | 26.4 | 2.7 | 22.7 | 12.6 | −0.9 | −38.8 | 0.65 |
| Layer Stack 2 | 33.3 | 25.5 | 2 | 24.6 | 8 | 5 | −43.7 | 0.71 |

$R_{ext}$ = External reflection;
a*G, b*G = a*, b* values measured on glass side;
$R_{int}$ = Internal reflection;
a*C, b*C = a*, b* values measured on coating side Both the layer stacks exhibited a golden appearance on the glass side (that is on the building exterior) and a brilliant blue color on the coating side (that is on the building interior). It was evident that layer stack 2 having a decreased NbN thickness recorded an increased light transmission ($T_L$) value. Transparent glass has an emissivity of 89%, whereas the gold colored solar control glass article according to this embodiment of the present disclosure has an emissivity value as less as 65% and 71%. Internal reflection ($R_{int}$) of the coated glass substrates was maintained below 15%.

Example 2

Rose/Purple Colored Solar Control Glass Article

Two glass substrates were coated with the below shown layer stacks:

Layer Stack 3: Glass//$Si_3N_4$ (17)/NbN (12)/$Si_3N_4$ (116)
Layer Stack 4: Glass//$Si_3N_4$ (17)/NbN (12)/$Si_3N_4$ (124)

Optical properties of the two glass samples coated with layer stack 2 and layer stack 4 are summarized in Table 2.

TABLE 2

Optical Properties of Rose/Purple Colored Solar Control Glass Article

| | | Outside | | | Inside | | | Emissivity |
|---|---|---|---|---|---|---|---|---|
| | $T_L$ | $R_{ext}$ | a*G | b*G | $R_{int}$ | a*C | b*C | E |
| Layer Stack 3 | 27.5 | 13.6 | 9.2 | 4.7 | 31.4 | −9.5 | −14.7 | 0.75 |
| Layer Stack 4 | 24.7 | 13.1 | 8.1 | −4.3 | 37.3 | −9.5 | −4.9 | 0.75 |

$R_{ext}$ = External reflection;
a*G, b*G = a*, b* values measured on glass side;
$R_{int}$ = Internal reflection;
a*C, b*C = a*, b* values measured on coating side Glass substrates coated with layer stack 3 exhibited a rose colored appearance and that coated with layer stack 4 exhibited a purple colored appearance on the glass side (G). The internal reflection ($R_{int}$) was found to be high at 31-37%. The external reflection ($R_{ext}$) is much lower making the color subtle in appearance.

Durability Studies

The following durability studies were performed for the glass substrates coated with layer stack 1 to 4.

Erichsen Brush Test

The brush test was used to evaluate the resistance of the layer stacks to erosion caused by scrubbing. In this test a soft brush is rubbed against the coating where the coating is submerged in the water. This test is done to test mechanical robustness against washing machine brushes during processing.

The samples were tempered at a temperature above 600° C. after the Erichsen brush test. This step reveals the presence of any minor scratches that occurred during the test procedure. However, the tested samples did not show any sign of scratches.

In another experiment, the samples coated with layer stack 1 to layer stack 4 were first tempered at a temperature above 600° C. and then subjected to the Erichsen brush test procedure. Again the samples did not show any sign of minor scratch or coating erosion.

Taber Abrasion Test

Taber abrasion test was used for performing accelerated wear resistance testing. It involved mounting a flat sample of approximately 100 mm² to a turntable platform that rotate on a vertical axis at a fixed speed. The wear action was carried out by two rotating abrading wheels supported on a loading arm which applied 250-gram pressure against the sample, exclusive of the weight of the wheel in contact with sample. The weight before and after the test were measured to calculate the overall weight loss of the test samples. The results of the durability studies are summarized in Table 3.

TABLE 3

Results of Durability Studies

| | | Results | | | |
|---|---|---|---|---|---|
| Name of the test | Target/ Specifications | Layer Stack 1 | Layer Stack 2 | Layer Stack 3 | Layer Stack 4 |
| Erichsen Brush Test (1000 cycles) | No pinholes, scratches or erosion seen | Pass | Pass | Pass | Pass |
| | Color change <2 | 1.8 | 1.7 | 1.9 | 1.8 |
| Taber Abrasion test 2000 cycles using CS-10F wheel | Weight loss ≤0.1 | No change | No change | No change | No Change |
| | Change in transmission ΔT < 2 | 1.8 | 1.6 | 1.8 | 1.7 |

The color change (ΔE*) after the tempering process was measured for transparent substrates coated with layer stack 1 and layer stack 2. The results are tabulated in Table 4. ΔE* value of the samples were found to be less than 2.5. Similarly, emissivity change after tempering process was measured for transparent substrates coated with layer stack 3 and layer stack 4. The samples did not record any change in emissivity.

TABLE 4

Color Change of Samples

| | Average Value |
|---|---|
| ΔE* Transmission color | 2.4 |
| ΔE* coating side (C) color | 1.7 |
| ΔE* glass side (G) color | 1.5 |

Example 3

Two 6 mm thick glass substrates (Planilux marketed by Saint-Gobain) were coated with the below shown layer stacks:
Layer Stack 5: Glass//$Si_3N_4$ (43)/NbN (20)/$Si_3N_4$ (75)
Layer Stack 6: Glass//$Si_3N_4$ (27)/NbN (7)/$Si_3N_4$ (85)
Optical properties of the two glass samples coated with layer stack 5 and layer stack 6 are summarized in Table 5.

TABLE 5

Optical Properties of Layer Stack 5 and Layer Stack 6

| | | | Outside | | | Inside | |
|---|---|---|---|---|---|---|---|
| | $T_L$ | $R_{ext}$ | a*G | b*G | $R_{int}$ | a*C | b*C |
| Layer Stack 5 | 29.5 | 20.1 | 3 | 20 | 7.6 | 7.4 | −40 |
| Layer Stack 6 | 44.5 | 22 | −0.5 | 22.3 | 4.6 | 11.9 | −43.2 |

The external appearance of glass substrates coated with layer stack 5 and layer stack 6 was observed to be golden color. However, the external reflection ($R_{ext}$) was found to be lower than glass substrates coated with layer stack 1 and layer stack 2 thereby making the golden color less prominent.

Example 4

Three 6 mm thick glass substrates (Planilux marketed by Saint-Gobain) were coated with the below shown layer stacks:
Layer Stack 7: Glass//$Si_3N_4$ (29)/NbN (14)/$Si_3N_4$ (116)
Layer Stack 8: Glass//$Si_3N_4$ (29)/NbN (14)/$Si_3N_4$ (126)
Layer Stack 9: Glass//$Si_3N_4$ (10)/NbN (15)/$Si_3N_4$ (114)
Optical properties of the three glass samples coated with layer stack 7, layer stack 8 and layer stack 9 are summarized in Table 6.

TABLE 6

Optical Properties of Layer Stack 7, Layer Stack 8 and Layer Stack 9

| | | | Outside | | | Inside | |
|---|---|---|---|---|---|---|---|
| | $T_L$ | $R_{ext}$ | a*G | b*G | $R_{int}$ | a*C | b*C |
| Layer Stack 7 | 22.6 | 13.5 | 7.2 | 3.6 | 36.5 | −9.7 | −7.7 |
| Layer Stack 8 | 21 | 13.3 | 5.8 | −3.5 | 40.6 | −9.7 | 2.7 |
| Layer Stack 9 | 21 | 20 | 5.9 | 2.3 | 32.6 | −9.1 | −9.9 |

Layer stacks 7, 8 and 9 exhibit different $T_L$ values compared to layer stack 3 and 4 shown in example 2. While layer stack 7 and 9 results in a rose colored external reflection, layer stack 8 results in a purple colored external reflection.

It should be noted that the above examples is only indicative and does not limit the scope of the invention in any manner. The brightness of the external color reflected by the coated glass substrates may be varied by varying the reflection values ($R_{int}$ and $R_{ext}$).

Comparative Example 1

The example given below illustrate various embodiments of the invention and allow the characteristics of the multilayer coatings obtained according to the prior art and according to the invention to be compared.

TABLE 7

Comparative Example 1

| Stack identification | | Thickness (nm) | | |
|---|---|---|---|---|
| Patent no. | Example | Glass//Si3N4 | NbN | Si3N4 |
| WO2005105687 | 7 | 10 | 10 | 15 |
| | 8 | 75 | 15 | 10 |
| U.S. 6,994,910B | 1 | 80 | 25.4 | 30 |
| | 2 | 5 | 23.1 | 30 |
| Present Disclosure | 1 | 24 | 12, 20 | 80 |
| | 2 | 17 | 12 | 116,124 |

It was evident that the two prior art documents focus on a thicker dielectric layer above the transparent substrate. On the contrary the present disclosure provides a multilayer coating having a thicker dielectric layer above the metal nitride functional layer as shown in Table 7. This thicker dielectric layer provided above the metal nitride functional layer contributes to the gold or rose/purple color of the coated solar control article of the present disclosure.

The optical performance of the prior art references is tabulated in Table 8.

TABLE 8

Comparative Optical Performance Results

| | | External | | | Internal | | |
|---|---|---|---|---|---|---|---|
| | Example | $R_{ext}$ | a*G | b*G | $R_{int}$ | a*C | b*C |
| WO2005105687 | 7 | 17.9 | −0.4 | −3.5 | 27.8 | 0.7 | 3.1 |
| | 8 | 6 | −0.9 | −16.4 | 36 | 0 | 11.6 |
| U.S. 6,994,910B | 1 | 20.3 | 0.8 | −14.5 | 28.9 | 1.4 | 34.4 |
| | 2 | 31.8 | −1.3 | −0.9 | 23 | 1.8 | 25.6 |
| Present Disclosure | 1 | >20.3 | +ve | +ve | <15 | −ve | −ve |
| | 2 | ~13 | +ve | +ve | >28.9 | −ve | −ve |

The variation obtained in a*, b* values both on the glass side (G) and coated side (C) of the present multilayer coating 200 are strikingly different from that recorded by the prior art references.

INDUSTRIAL APPLICABILITY

The coated solar control glass article 100 of the present disclosure can be used in a monolithic, double or triple glazing. These glazings are installed in such a way that the multilayer coating is preferably on face 2, the faces of substrates being numbered from outside to the inside of the building or room which is equipped therewith, giving it a solar radiation protection effect. These glazings exhibit an emissivity value equal to or less than 80%. The coated solar control glass article 100 can also be used in building wall cladding panel of curtain walling for interior applications. Further the coated solar control glass article 100 can also be used as a side window, rear window or sunroof for an automobile or other vehicle.

The coated solar control glass article 100 of the present disclosure can also be enameled, strengthened or toughened and used for building interior applications. The durability studies of these coated solar control glass article 100 provide for a longer life of these articles. In embodiments where the coated solar control glass article 100 is heat treatable, the article can be handled before heat treatment. The major advantage being the transparent substrate may be provided with the multilayer coating, an enamel coating at a manufacturing site and can be transported to another job site without causing the coating to peel off or become damaged at the borders. Further the coated solar control glass article 100 coated with the enamel 430 may be cut, edge grind, beveled, drilled, sized and finished before being tempered. Here again the coating does not peel off or get damaged at the borders of the cutting line.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Certain features, that are for clarity, described herein in the context of separate embodiments, may also be provided in combination in a single embodiment. Conversely, various features that are, for brevity, described in the context of a single embodiment, may also be provided separately or in a sub combination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The description in combination with the figures is provided to assist in understanding the teachings disclosed herein, is provided to assist in describing the teachings, and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent that certain details regarding specific materials and processing acts are not described, such details may include conventional approaches, which may be found in reference books and other sources within the manufacturing arts.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

LIST OF ELEMENTS

100 Coated Solar Control Glass Article
110 Glass Substrate
120 Metal Nitride Functional Layer
130a Dielectric Layer
130b Dielectric Layer
200 Multilayer Coating
200a Multilayer Coating
200b Multilayer Coating
202 Glass Side (G)
203 Coating Side (C)
300 Gold Colored Coated Solar Control Glass Article
302 Niobium Nitride Layer
303a Silicon Nitride Layer
303b Silicon Nitride Layer
400 Heat Treatable Gold Colored Solar Control Glass Article
430 Enamel
500 Rose/Purple Colored Coated Solar Control Glass Article
502 Niobium Nitride Layer 503a Silicon Nitride Layer
503b Silicon Nitride Layer

We claim:

1. A transparent substrate having a gold color or a rose/purple color glass side reflection and including a multilayer coating having solar control properties comprising:
a metal nitride functional layer sandwiched between two transparent dielectric layers, wherein the dielectric layer provided above the metal nitride functional layer is thicker than the dielectric layer provided below the metal nitride functional layer, wherein the thickness of the dielectric layer provided above the metal nitride functional layer is greater than 60 nm and less than 150 nm and the thickness of the dielectric layer provided below the metal nitride functional layer is greater than 10 nm and less than 45 nm, wherein the multilayer coating provides a visible light transmission ranging from 10% to 50%.

2. The transparent substrate as claimed in claim 1, wherein the metal nitride functional layer comprises of at least one metal nitride selected from the group consisting of niobium, tantalum, molybdenum, nickel, chromium and zirconium.

3. The transparent substrate as claimed in claim 1, wherein the metal nitride functional layer comprises niobium nitride or nickel chromium nitride.

4. The transparent substrate as claimed in claim 1, wherein the transparent dielectric layers are based on aluminium nitride, aluminium oxynitride, silicon nitride or silicon oxynitride or silicon aluminium nitride.

5. The transparent substrate as claimed in claim 1, wherein thicknesses of the transparent dielectric layers are adjusted to obtain, on the side opposite to the side provided with the multilayer coating, a reflectance color of the transparent substrate defined by $0<a^*<4$ and $b^*>10$.

6. The transparent substrate as claimed in claim 1, wherein the thickness of the metal nitride functional layer is greater than 10 nm and less than 35 nm.

7. The transparent substrate as claimed in claim 1, wherein the multilayer coating is applied on a coating side of the transparent substrate.

8. The transparent substrate as claimed in claim 1, wherein the transparent substrate exhibits a gold color reflection on a glass side opposite to the coating side of the transparent substrate when the thickness of the dielectric layer provided above the metal nitride functional layer is greater than 60 nm and less than 100 nm.

9. The transparent substrate as claimed in claim 1, wherein the transparent substrate exhibits a rose/purple color reflection on a glass side opposite to the coating side of the transparent substrate and the thickness of the dielectric layer provided above the metal nitride functional layer is greater than 100 nm and less than 150 nm.

10. The transparent substrate as claimed in claim 1, wherein the transparent substrate is made of clear glass or tinted glass.

11. The transparent substrate as claimed in claim 1, wherein the transparent substrate is enamelled and/or heat treated.

12. A heat treatable solar control glass article comprising:
a transparent substrate comprising a multilayer coating having solar control properties as claimed in claim 1, and
an enamel comprising glass frit, an organic polymer and a pigment provided above the multilayer coating, wherein the heat treatable solar control glass article can be handled before heat treatment.

13. The heat treatable solar control glass article as claimed in claim 12, wherein handling includes cutting, edge grinding, beveling, drilling, sizing, finishing and transporting of the heat treatable solar control glass article.

14. The heat treatable solar control glass article as claimed in claim 12, wherein the heat treatment involves heating to a temperature above 600° C. to obtain a heat treated solar control glass article.

15. A heat treated solar control glass article as claimed in claim 14 having a $\Delta E^*$ less than or equal to 2.5 on a coating side and a glass side.

16. A composite glazing comprising:
a plurality of glass substrates, wherein at least one glass substrate comprises a multilayer coating having solar control properties as claimed in claim 1; and
at least one polymeric interlayer configured to bond the plurality of glass substrates.

17. A composite glazing comprising:
a plurality of glass substrates, wherein at least one glass substrate comprises a heat treated solar control glass article as claimed in claim 11; and
at least one polymeric interlayer configured to bond the plurality of glass substrates.

18. The composite glazing as claimed in claim 16, wherein the polymeric interlayer is made of polyvinyl butyral (PVB) and/or other organic polymers selected from the group consisting of polyurethane and/or ethylvinylacetate (EVA) and/or polyvinyl chloride and/or polyester and/or polyethylenevinylacetate (PET) and/or polycarbonate and/or polypropylene and/or polyethylene and/or polyurethacrylate or their combinations thereof.

19. A monolithic glazing or a double glazing incorporating the transparent substrate as claimed in claim 1, wherein the multilayer coating is on face 2, the faces of substrates being numbered from outside to the inside of the building or room which is equipped therewith, giving it a solar radiation protection effect.

20. The monolithic glazing or double glazing as claimed in claim 19 having an emissivity value equal to or less than 80%.

21. A building wall cladding panel of curtain walling comprising the transparent substrate as claimed in claim 1.

22. A side window, rear window or a sunroof for an automobile or other vehicle formed by incorporating a transparent substrate as claimed in claim 1.

* * * * *